(12) United States Patent
Palyutina et al.

(10) Patent No.: US 12,245,040 B2
(45) Date of Patent: Mar. 4, 2025

(54) PROVISION OF LOCATION-SPECIFIC USER INFORMATION

(71) Applicant: Nokia Technologies Oy, Espoo (FI)

(72) Inventors: Karina Palyutina, Cambridge (GB);
Troels Roennow, Cambridge (GB);
Enrique Martin-Lopez, Madrid (ES);
Edward FitzGerald, Cambourne (GB)

(73) Assignee: Nokia Technologies Oy, Espoo (FI)

( * ) Notice: Subject to any disclaimer, the term of this patent is extended or adjusted under 35 U.S.C. 154(b) by 1233 days.

(21) Appl. No.: 16/954,348

(22) PCT Filed: Dec. 10, 2018

(86) PCT No.: PCT/FI2018/050889
§ 371 (c)(1),
(2) Date: Jun. 16, 2020

(87) PCT Pub. No.: WO2019/122503
PCT Pub. Date: Jun. 27, 2019

(65) Prior Publication Data
US 2021/0092613 A1 Mar. 25, 2021

(30) Foreign Application Priority Data
Dec. 19, 2017 (EP) ...................... 17208332

(51) Int. Cl.
*H04L 9/40* (2022.01)
*G06Q 20/12* (2012.01)
(Continued)

(52) U.S. Cl.
CPC .......... *H04W 12/63* (2021.01); *G06Q 20/123* (2013.01); *G06Q 20/38215* (2013.01);
(Continued)

(58) Field of Classification Search
CPC ........................... H04L 63/20; H04L 63/0853
(Continued)

(56) References Cited

U.S. PATENT DOCUMENTS

| 2005/0141541 A1 | 6/2005 | Cuny et al. |
| 2009/0024661 A1 | 1/2009 | Kelliher |

(Continued)

FOREIGN PATENT DOCUMENTS

| CN | 1918926 A | 2/2007 |
| CN | 101682618 A | 3/2010 |

(Continued)

OTHER PUBLICATIONS

Office action received for corresponding Chinese Patent Application No. 201880089649.1, dated Nov. 23, 2021, 10 pages of office action and 3 pages of English summary available.

(Continued)

*Primary Examiner* — Anthony D Brown
(74) *Attorney, Agent, or Firm* — Laine IP Oy (57) ABSTRACT

According to an example aspect of the present invention, there is provided a method, comprising: receiving user information provided by a user equipment, associating spatiotemporal information with the user information on the basis of location of at least one wireless access network device in communication with the user equipment, generating a proof of location indication transaction associated with the user information on the basis of the spatiotemporal information, and providing the proof of location indication transaction to a distributed ledger.

13 Claims, 9 Drawing Sheets

(51) Int. Cl.

| | |
|---|---|
| *G06Q 20/38* | (2012.01) |
| *G06Q 20/40* | (2012.01) |
| *G06Q 30/018* | (2023.01) |
| *G06Q 40/04* | (2012.01) |
| *G06Q 50/26* | (2012.01) |
| *H04L 9/08* | (2006.01) |
| *H04L 9/32* | (2006.01) |
| *H04W 4/029* | (2018.01) |
| *H04W 12/63* | (2021.01) |
| *G06Q 20/06* | (2012.01) |
| *G06Q 40/08* | (2012.01) |
| *G06Q 50/18* | (2012.01) |
| *H04L 9/00* | (2022.01) |

(52) U.S. Cl.
CPC ..... *G06Q 20/3827* (2013.01); *G06Q 20/3829* (2013.01); *G06Q 20/389* (2013.01); *G06Q 20/4014* (2013.01); *G06Q 20/4015* (2020.05); *G06Q 30/0185* (2013.01); *G06Q 40/04* (2013.01); *G06Q 50/265* (2013.01); *H04L 9/0819* (2013.01); *H04L 9/3226* (2013.01); *H04L 9/3239* (2013.01); *H04L 63/123* (2013.01); *H04W 4/029* (2018.02); *G06Q 20/0655* (2013.01); *G06Q 40/08* (2013.01); *G06Q 50/18* (2013.01); *G06Q 2220/00* (2013.01); *H04L 9/50* (2022.05); *H04L 2209/46* (2013.01); *H04L 2209/80* (2013.01)

(58) Field of Classification Search
USPC .............................................. 726/1; 713/171
See application file for complete search history.

(56) References Cited

U.S. PATENT DOCUMENTS

| | | |
|---|---|---|
| 2010/0205316 A1 | 8/2010 | Xue et al. |
| 2013/0322630 A1 | 12/2013 | Wolman et al. |
| 2016/0098723 A1 | 4/2016 | Feeney |
| 2016/0162897 A1 | 6/2016 | Feeney |
| 2017/0041148 A1 | 2/2017 | Pearce |
| 2017/0103468 A1 | 4/2017 | Orsini et al. |
| 2017/0116693 A1 | 4/2017 | Rae et al. |
| 2017/0140408 A1 | 5/2017 | Wuehler |
| 2017/0228734 A1 | 8/2017 | Kurian |
| 2017/0228822 A1 | 8/2017 | Creighton, IV et al. |
| 2017/0243209 A1 | 8/2017 | Johnsrud et al. |
| 2018/0130050 A1* | 5/2018 | Taylor ................... H04L 9/3236 |
| 2018/0211524 A1* | 7/2018 | Furuichi ............ G01C 21/3415 |
| 2019/0090090 A1* | 3/2019 | Doyal ................ G06Q 20/3224 |

FOREIGN PATENT DOCUMENTS

| | | |
|---|---|---|
| CN | 104168265 A | 11/2014 |
| CN | 105138928 A | 12/2015 |
| EP | 3410156 A1 | 12/2018 |
| WO | 03/007542 A1 | 1/2003 |
| WO | 2018/229228 A1 | 12/2018 |

OTHER PUBLICATIONS

Office action received for corresponding Chinese Patent Application No. 201880089649.1, dated Apr. 11, 2022, 3 pages of office action and no page of English summary available.

Zyskind et al., "Enigma: Decentralized Computation Platform with Guaranteed Privacy", arXiv, Jun. 10, 2015, pp. 1-14.

Hou et al., "A Non-monetary Protocol for Peer-to-peer Content Distribution in Wireless Broadcast Networks with Network Coding", 11th International Symposium and Workshops on Modeling and Optimization in Mobile, Ad Hoc and Wireless Networks (WiOpt), May 13-17, 2013, pp. 170-177.

Extended European Search Report received for corresponding European Patent Application No. 17208332.1, dated Jun. 20, 2018, 14 pages.

International Search Report and Written Opinion received for corresponding Patent Cooperation Treaty Application No. PCT/FI2018/050889, dated Mar. 8, 2019, 16 pages.

Brambilla et al., "Using Blockchain for Peer-to-Peer Proof-of-Location", arXiv, Jul. 31, 2017, 11 pages.

* cited by examiner

PROVISION OF LOCATION-SPECIFIC USER INFORMATION

RELATED APPLICATION

This application claims priority to PCT Application No. PCT/FI2018/050889, filed on Dec. 10, 2018, which claims priority to European Patent Application No. 17208332.1, filed on Dec. 19, 2017, each of which is incorporated herein by reference in its entirety.

FIELD

The present invention relates to provision of location-specific user information, and further to arranging provision of sensitive user data, such as personal media content, to further interested parties.

BACKGROUND

Personal media content, such as images and videos, is increasingly shared and distributed via various services, such as social media applications. 'Sensitive data' is broadly defined as personal to the user, such that the user does not wish to disclose it to everyone. Each platform, service or application typically has its own privacy control mechanism. Furthermore, there are situations where a party requesting such user's data requires proof that the data is genuine and belongs to the user. A centralised server may be provided to act as middleman between the parties, creating trust between the entities, and control access to the sensitive data on behalf of the data-providing user.

SUMMARY

The invention is defined by the features of the independent claims. Some specific embodiments are defined in the dependent claims.

According to a first aspect of the present invention, there is provided a method, comprising: receiving user information provided by a user equipment, associating spatiotemporal information with the user information on the basis of location of at least one wireless access network device in communication with the user equipment, generating a proof of location indication transaction associated with the user information on the basis of the spatiotemporal information, and providing the proof of location indication transaction to a distributed ledger.

According to a second aspect of the present invention, there is provided a method, comprising: identifying a proof of location indication transaction associated with a location of interest amongst proof of location indication transactions stored in a distributed ledger, wherein the proof of location indication transaction comprises spatiotemporal information associated with user information provided by a user equipment, issuing a proof of location request transaction on the basis of and identifying the proof of location indication transaction, detecting a response to the proof of location request transaction, the response indicating user's willingness to provide the user information associated with the proof of location indication transaction, and issuing a transfer transaction for causing provision of the user information in response to verification of at least the transfer transaction.

According to a third aspect of the present invention, there is provided a method, comprising: sending user information to a wireless access network device for generating a proof of location indication transaction for a distributed ledger on the basis of spatiotemporal information associated with the user information, detecting a proof of location request transaction identifying the proof of location indication transaction, and causing provision of a response to the proof of location request transaction, indicating user's willingness to provide the user information associated with the proof of location indication transaction.

According to a fourth aspect, there is provided an apparatus, comprising at least one processing core, at least one memory including computer program code, the at least one memory and the computer program code being configured to, with the at least one processing core, cause the apparatus at least to: receive user information provided by a user equipment, associate spatiotemporal information with the user information on the basis of location of at least one wireless access network device in communication with the user equipment, generate a proof of location indication transaction associated with the user information on the basis of the spatiotemporal information, and provide the proof of location indication transaction to a distributed ledger.

According to a fifth aspect, there is provided an apparatus comprising at least one processing core, at least one memory including computer program code, the at least one memory and the computer program code being configured to, with the at least one processing core, to cause the apparatus at least to: identify a proof of location indication transaction associated with a location of interest amongst proof of location indication transactions stored in a distributed ledger, wherein the proof of location indication transaction comprises spatiotemporal information associated with user information provided by a user equipment, issue a proof of location request transaction on the basis of and identifying the proof of location indication transaction, detect a response to the proof of location request transaction, the response indicating user's willingness to provide the user information associated with the proof of location indication transaction, and issue a transfer transaction for causing provision of the user information in response to verification of at least the transfer transaction.

According to a sixth aspect, there is provided an apparatus comprising at least one processing core, at least one memory including computer program code, the at least one memory and the computer program code being configured to, with the at least one processing core, to cause the apparatus at least to: send user information to a wireless access network device for generating a proof of location indication transaction for a distributed ledger on the basis of spatiotemporal information associated with the user information, detect a proof of location request transaction identifying the proof of location indication transaction, and cause provision of a response to the proof of location request transaction, indicating user's willingness to provide the user information associated with the proof of location indication transaction.

According to a seventh aspect, there is provided a computer program product or a non-transitory computer readable medium having stored thereon a set of computer readable instructions that, when executed by at least one processor, cause an apparatus to at least: receive user information provided by a user equipment, associate spatiotemporal information with the user information on the basis of location of at least one wireless access network device in communication with the user equipment, generate a proof of location indication transaction associated with the user information on the basis of the spatiotemporal information, and provide the proof of location indication transaction to a distributed ledger.

According to an eight aspect, there is provided a computer program product or a non-transitory computer readable medium having stored thereon a set of computer readable instructions that, when executed by at least one processor, cause an apparatus to at least: identify a proof of location indication transaction associated with a location of interest amongst proof of location indication transactions stored in a distributed ledger, wherein the proof of location indication transaction comprises spatiotemporal information associated with user information provided by a user equipment, issue a proof of location request transaction on the basis of and identifying the proof of location indication transaction, detect a response to the proof of location request transaction, the response indicating user's willingness to provide the user information associated with the proof of location indication transaction, and issue a transfer transaction for causing provision of the user information in response to verification of at least the transfer transaction According to a ninth aspect, there is provided a computer program product or a non-transitory computer readable medium having stored thereon a set of computer readable instructions that, when executed by at least one processor, cause an apparatus to at least: send user information to a wireless access network device for generating a proof of location indication transaction for a distributed ledger on the basis of spatiotemporal information associated with the user information, detect a proof of location request transaction identifying the proof of location indication transaction, and cause provision of a response to the proof of location request transaction, indicating user's willingness to provide the user information associated with the proof of location indication transaction.

EMBODIMENTS

There are now provided improved provision of sensitive and location-specific user information by applying a distributed ledger. A distributed ledger may be applied for automatically controlling access to the user's information. The purpose of the distributed ledger is to record and enforce a verifiable order of events. A distributed ledger can be considered a general database synchronized between many parties, which, at successive time instances, comprises successive states of consensus about a particular matter, here user's proof of location information. Such states may be reached by the many parties, typically nodes in a peer-to-peer (P2P) network, following a decentralized consensus algorithm. In general, this provides an agreement between the nodes without assuming trust between them. Different service providers may oversee in the distributed ledger that every participant handling personal media content is playing by the rules set by the user.

Proof of location may be provided to the distributed ledger for user's data, such as personal media data and/or identification data, by associating the user data with the location of the data-providing user equipment defined on the basis of location of at least one wireless access network element communicating with the user equipment. Thus, proof of location may be generated for a user by using established cell tower infrastructure. A public distributed ledger may serve as a dashboard, such that media can be advertised without disclosing owner of the sensitive information.

Figure 1:
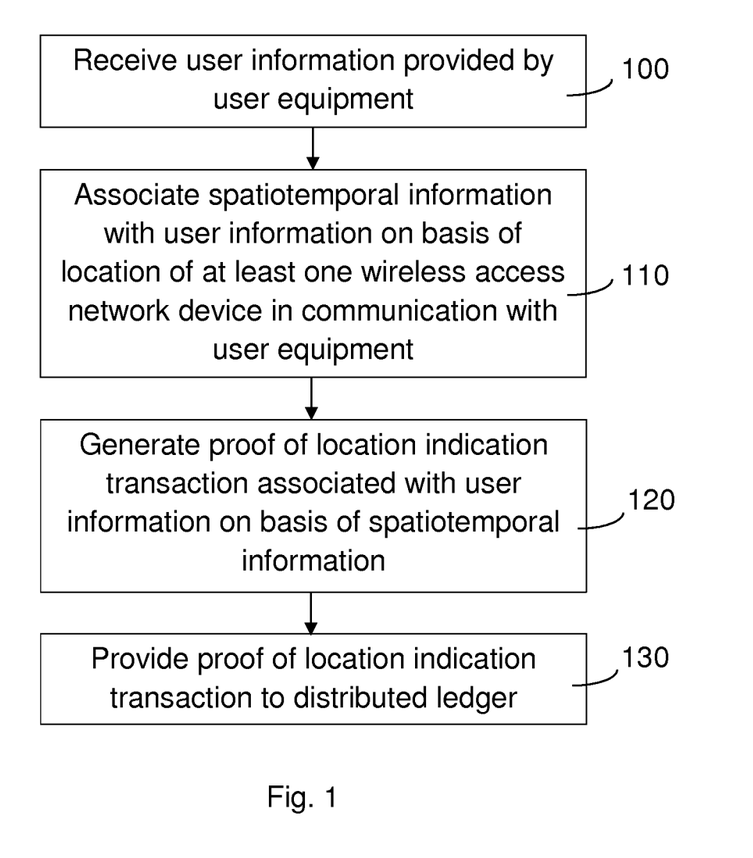
FIGS. 1, 2, and 3 illustrate methods in accordance with at least some embodiments.

FIG. 1 illustrates a method according to some embodiments. The method may be implemented in an apparatus or device verifying or providing a proof of location for a user equipment, such as a wireless access network device, a wireless access network controller or management device, a network operator device, an authority device, or a set of devices co-operatively verifying the proof of location.

The method comprises receiving 100 user information provided by a user equipment. Spatiotemporal information is associated 110 with the user information on the basis of location of at least one wireless access network device in communication with the user equipment. A proof of location indication transaction associated with the user information is generated 120 on the basis of the spatiotemporal information. The proof of location indication transaction is provided 130 to a distributed ledger.

Spatiotemporal information herein generally refers to time information and location information that is directly or indirectly associated with the user information provided by the user equipment, such as identification and/or media data, and generated on the basis of the location of the user equipment. Such spatiotemporal information may be applied for proof of location, to validate that the user information was provided by the user equipment at the given time and location. The spatiotemporal information may be associated with the user data by creating one or more data records comprising or referencing the spatiotemporal information or otherwise connecting the spatiotemporal information and the user data, for example.

Figure 2:
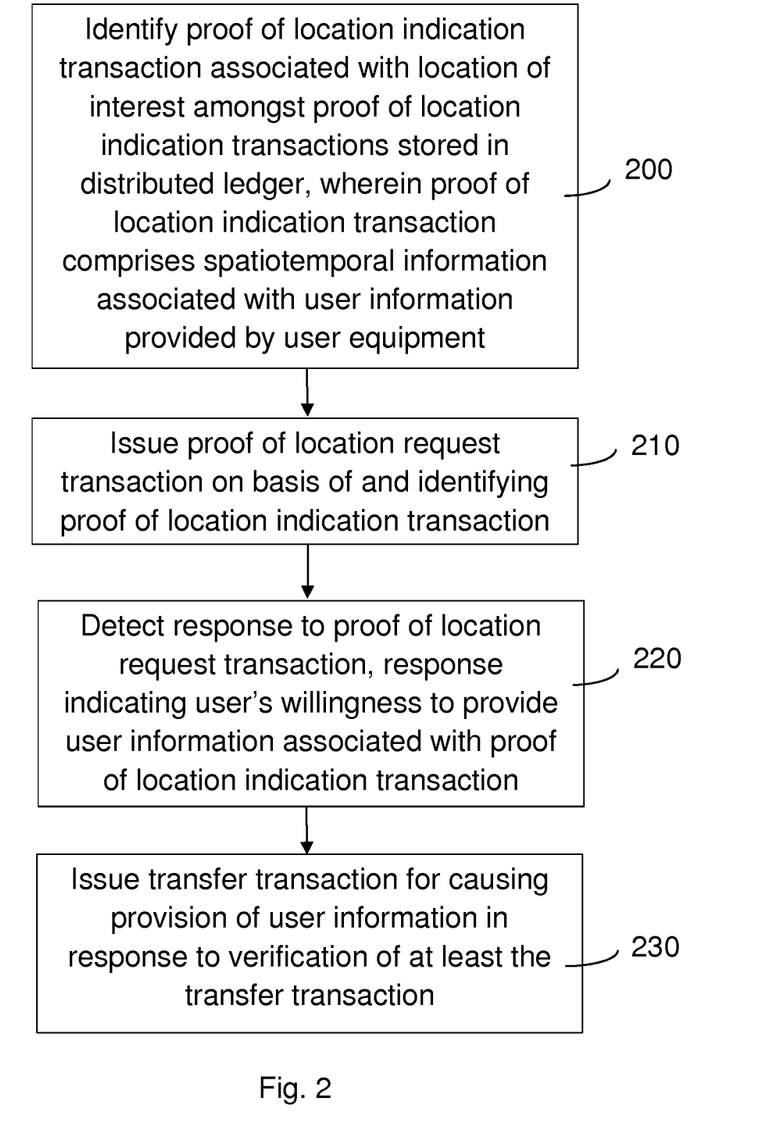

FIG. 2 illustrates a method according to some embodiments. The method may be implemented in a proof of location requesting apparatus or device, which may be an apparatus requiring and using the proof of location information, such as an authority apparatus, a surveillance apparatus, a rights controller apparatus, which may be a user device, a service provider device, or a server, for example.

A proof of location indication transaction associated with a location of interest is identified 200 amongst proof of location indication transactions stored in a distributed ledger, wherein the proof of location indication transaction comprises spatiotemporal information associated with user information provided by a user equipment. The proof of location indication transaction may be transaction provided by the proof of location verifying device in block 130. It will be appreciated that there are many options for specifying and matching the location information and the location of interest, which may refer to a specific location or location area corresponding to a desired degree of precision.

A proof of location request transaction is issued 210 on the basis of and identifying the proof of location indication transaction. Issuing of a transaction may refer generally to generating the transaction and providing or sending it for further device(s) such as causing publishing at the distributed ledger. A response to the proof of location request transaction is detected 220, wherein the response indicates user's willingness to provide user information associated with the proof of location indication transaction. A transfer transaction is issued 230 for causing provision of the user information in response to verification of at least the transfer transaction.

Figure 3:
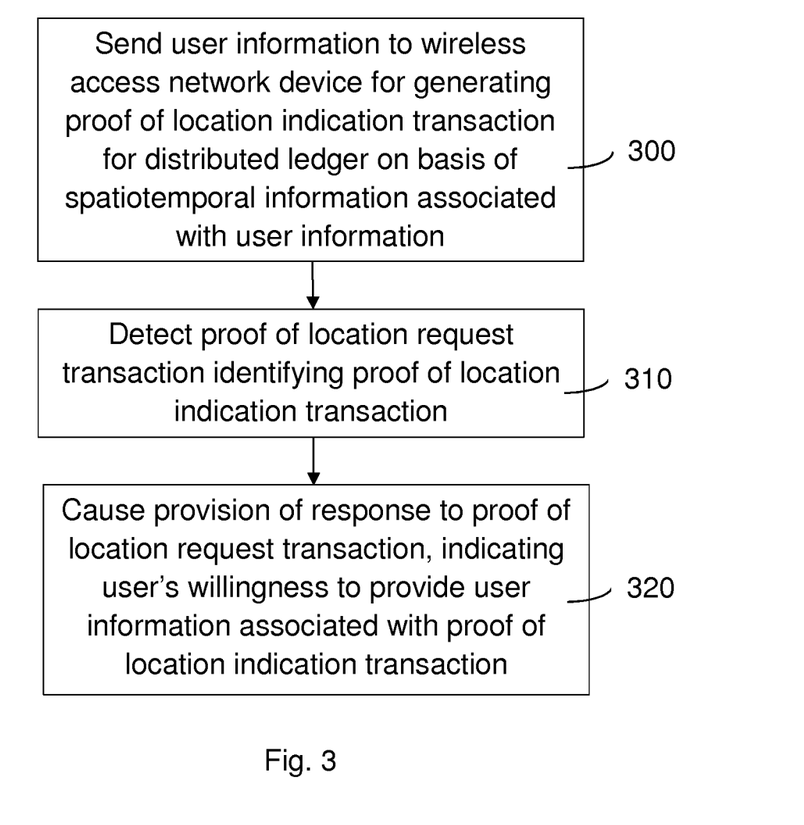

FIG. 3 illustrates a method which may be implemented by a user equipment providing the user information, such as a personal mobile communications device. User information for a wireless access network device is sent 300 to wireless access network for generating a proof of location indication transaction for a distributed ledger on the basis of spatiotemporal information associated with the user information. The spatiotemporal information may be generated on the basis of location (area) of the user equipment by applying the method of FIG. 1. A proof of location request transaction identifying the proof of location indication transaction is detected 310. The proof of location request transaction may be the transaction provided in block 210.

A response to the proof of location request transaction is provided 320, indicating user's willingness to provide the user information associated with the identified proof of location indication transaction. The response may be an acknowledging transaction to the request transaction provided by the user equipment to the distributed ledger, may identify the proof of location indication transaction and may be the response for block 220.

It will be appreciated that FIGS. 1 to 3 illustrate main features of the procedure for offering and providing the proof of location for interested parties and a number of further steps and embodiments may be applied, some of which are illustrated further below.

For example, there may be subsequent block(s) in the method of FIG. 1 of detecting the response to the proof of location request transaction indicating the user's willingness (provided in block 320) or the verification of the transfer transaction (provided in block 230). Access to the user information may be authorized for the requesting device directly upon the response/verification or after further intermediate action(s). Thus, the data and/or means for accessing the data, in some embodiments an encryption key for decrypting the user information stored in encrypted form) may be provided to the requesting device as additional blocks of FIGS. 1 and 2.

As a further example, there may be one or more intermediate steps between blocks 310 and 320 for checking if the user allows or has allowed provision of the user information in response to the proof of location request transaction. It will be also appreciated that there may be further steps regarding transaction verification after issuing or providing 130, 210, 230, 320 a transaction to the distributed ledger, and the transaction is published at the distributed ledger and the method may proceed to a subsequent step only after successful verification of the transaction.

The present features facilitate to allow verification and later proof of presence of the user information and the user equipment at location (area and time) verified by or on the basis of reliable network devices, such as cell tower infrastructure. The distributed ledger offers a decentralized, auditable, and tamper-proof registry of privacy permissions.

There are strong benefits for using the present decentralized system instead of centralized provision of user's sensitive data. Firstly, parties wouldn't need to trust each other, which is particularly relevant when monetary transactions take place in this system. Secondly, the middleman may be avoided. Let us consider an example scenario: if a single party has control over such a platform, it is possible that a conflict of interest might arise, where by it would be in the party's interest to censor the information as a consequence.

Further, by applying at least some degree of automatisation, the user may be relieved of the need to participate manually. Hence, a distributed ledger is very suitable for such an application.

While data sharing through a P2P network is generally known, problems emerge when dealing with data where accurate ownership, position and time information is crucial. Firstly, a fraudulent user may cheat by falsely claiming their submitted information was generated at the time and location required to receive an incentive. Hence, a form of location proof is required. Moreover, such a proof must be sufficient to prevent cheating without compromising users' privacy needlessly. Secondly, the party who is requesting the information may not wish to disclose the location publically, but only on a need to know basis. The presently disclosed features facilitate to enforce location proof while preserving privacy of both parties.

A protocol for providing sensitive user data or exchanging the sensitive user data for a reward is enabled without intermediation of a centralized third party. In some embodiments, multi-party computation (MPC) is applied with the distributed ledger stored in a distributed network, such as the blockchain. MPC may be used to ensure that the sensitive data is as-claimed before the data is exchanged for cryptocurrency or another asset. The MPC may also or instead of facilitating the secure exchange of assets be applied to other purposes, such as to verify the spatiotemporal information associated with the user information.

A public ledger updated on the basis of the proof of location indication transaction may thus serve as a dashboard, such that proof of location and potentially the associated user information, such as visual data, can be advertised (without disclosing location and owner of media). Neither the owner of the media nor the location need to be advertised publically but only on a need-to-know basis.

The proof of location can be used for variety of purposes. For example, interested parties may thus exchange a monetary reward for media taken at time and location of interest. Example applications of such a protocol are, for instance: providing personal media to police or insurance to serve as proof in court, selling personal health data for research purposes, and participating in research that requires data exchange. For example, with the advance of semi-autonomous vehicles, the number of vehicles equipped with cameras are ever-increasing. Ubiquitous video footage could be used productively for investigative purposes and vehicle owners can be incentivised to share such material. The present features facilitate a system enabling interested parties to request video footage based on geo-spatial coordinates. Other examples include the proof of location stored in the distributed ledger is used for creating an alibi, location-based gaming, proof of being somewhere when signing a deal, proof of being where needed, when required, etc.

In some embodiments, the proof of location request transaction comprises information of an asset, such cryptocurrency value, offered in exchange of providing the user information associated with the proof of location indication transaction. The response to the proof of location request transaction may indicate the user's willingness to participate in the exchange of the user information and the asset. The transfer transaction may comprise a signed authorization to issue the asset in response to verification of the exchange. The verification of the exchange may thus be triggered in response to the verification of the transfer transaction, i.e. after block 230. After the verification of the exchange, the authorization is executed and the exchange may be carried out.

In some embodiments, the verification of the exchange comprises multi-party computation, which may comprise: verifying an account indicated in the proof of location request transaction and verifying that an encryption key provided by the user equipment decrypts the user information provided by the user equipment in encrypted form. A transaction is issued for releasing the asset for the user and the encryption key is provided for the proof of location requesting device in response to successful verification of the exchange. The transfer transaction may be issued 230 by the proof of location requesting device to the account for releasing the asset for the user in response to successful verification of the exchange. Then, the encryption key is provided for the proof of location requesting device in response to successful verification of the exchange. The presently disclosed features facilitate to avoid trust issues around reward offered in response to disclosing the proof of location associated user information.

Figure 4:
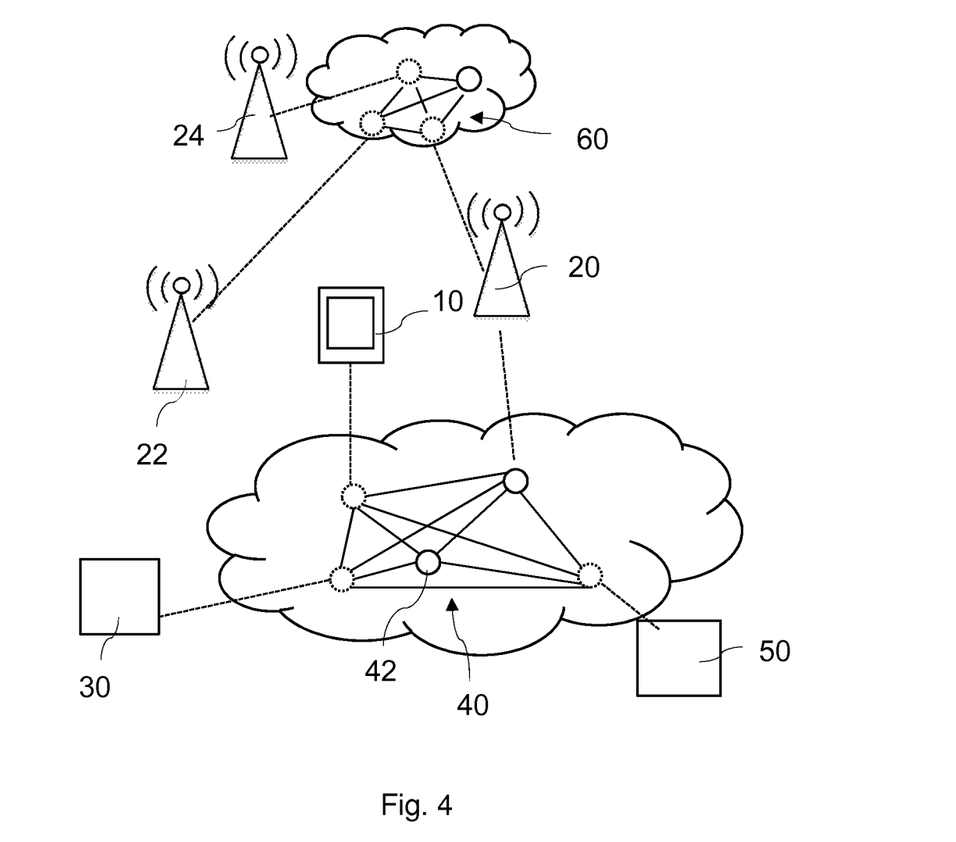
FIG. 4 illustrates an example system according to at least some embodiments.

FIG. 4 illustrates an example system in accordance with at least some embodiments of the present invention. A user equipment (UE) 10 may provide 300 the user information for at least one wireless access network device 20, such as a cellular base station, base station controller, or other type of access node.

The access network device 20 may carry out the method of FIG. 1 and establish and verify 110 the spatiotemporal information for the user information, in some embodiments in co-operation with or on the basis of signals from other access network device(s) 22, 24. Access network devices 20, 22, 24 may be connected to a private distributed network 60 and operate as nodes of the network 60. The user information may be stored in a private or permissioned distributed ledger stored at least in part of the nodes of the private network 60. The access network devices may also be configured to control access to the stored user information (in response to verification of the transfer transaction issued in block 230). The private network may be operated by telecom operators and/or authorities, for example.

The system may further comprise a proof of location requesting device 30, which may be any device having interest to obtain the user information associated with particular spatiotemporal information. The system may further comprise other devices 50 capable of at least accessing the distributed ledger.

The access network device 20, the user equipment 10, and the requesting device 30 may be connected to a public distributed network 40 and operate as nodes of the network 40. At least some of the nodes 10, 30, 42, 50 may store a public distributed ledger in which at least the proof of location indication transaction may be stored after verification thereof.

The devices 10, 30, 50 may comprise corporate, authority, and/or user devices, such as a server, a desktop/tablet/laptop computer, a smartphone, a set-top box, a media recording device, a vehicle communications unit, a wearable, or any other suitable electronic device. The system may comprise an administrator or management node, a hub, relay or other kind of intermediate device (not shown) for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

In some embodiments, the location of the user equipment 10 is defined for block 110 on the basis of estimation of the position of the user equipment in relation to two or more neighbouring access network devices 20, 22, 24, such as cellular base stations or base station sites. Each base station is responsible for a physical area of space, where they can verify the user equipment and thus associated user's/information owner's location. The location can be then quantised to a location corresponding to a desired degree of precision.

Examples of basic wireless positioning techniques include network parameter (cell ID) and signal strength based positioning. For example, the position may be estimated on the basis of triangulation or trilateration based and time delays or directions of signals from the user equipment as detected by two or more base stations. For example, distance-based (tri)lateration, angle or direction-based (tri) angulation, such as Angle of Arrival (AoA), Time of Arrival (ToA), Time Difference of Arrival (TDoA), Advanced Forward Trilateration (AFLT), Enhanced Observed Time Difference (EOTD) may be used. In some embodiments, two or more positioning techniques is used.

In some embodiments, the distributed network 20, 40 is a blockchain network and the nodes 10, 20, 30, 14, 50 operate as blockchain (BC) nodes and store local blockchain database. The distributed ledger is a blockchain ledger and the transactions are blockchain transactions. Information provided in a blockchain transaction, such as the proof of location indication transaction, may be stored in the blockchain ledger in response to validation of the respective blockchain transaction.

In some embodiments, the proof of location indication transaction is stored in a public blockchain ledger and a private blockchain ledger is maintained by wireless access network devices or wireless access network service providers for controlling access to the user data in encrypted form. A user information transaction may be stored in the private blockchain ledger. The user information transaction may comprise the user information encrypted by the user equipment and a hash of at the user information, but there may be also further information stored, such as the associated spatiotemporal information and/or reference to it or the proof of location indication transaction.

In some embodiments, the user information comprises audio and/or visual media data generated by the user equipment at the location of the user equipment. In an embodiment, the media data is video data and the present features may be applied to provide distributed geo-spatially indexed video footage pooling.

Below further example embodiments are illustrated in connection with blockchain-based system and for user media data, without however restricting application of the present features to such uses. For example, at least some of the below illustrated further features may be applied for embodiments in which the user information comprises instead of (or in addition to) the media data user identification information for reliably proving that the user was at the location (area) verified by cell towers.

Figure 5:
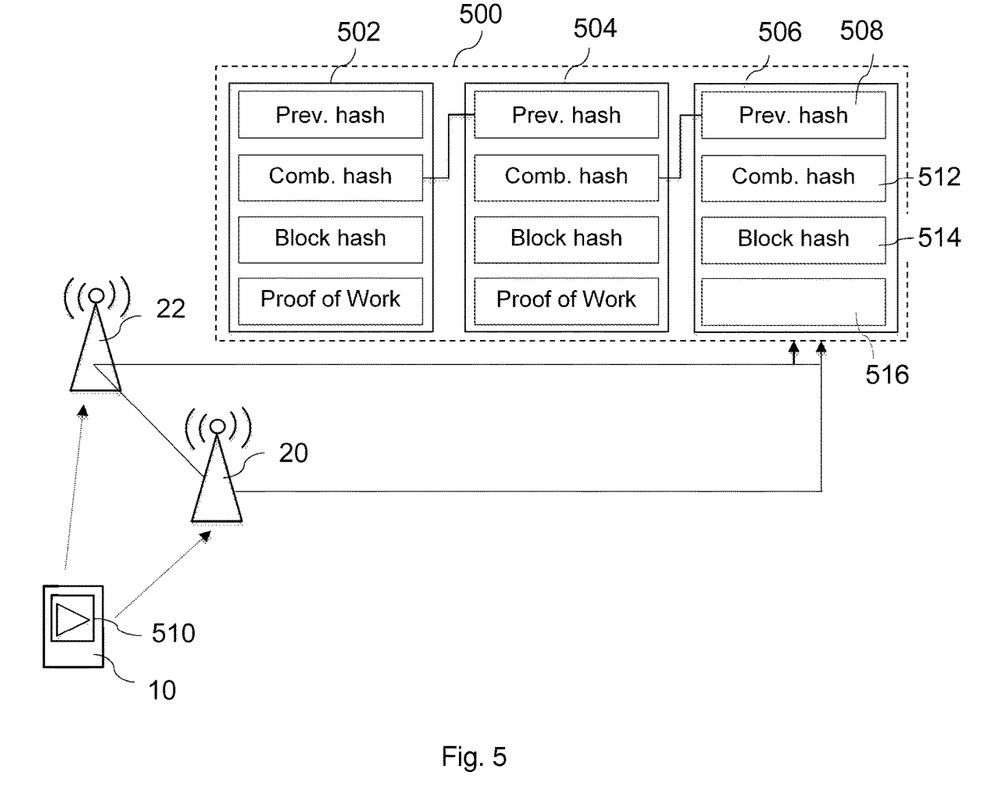
FIG. 5 illustrates provision of user media with location verification to a distributed ledger in accordance with at least some embodiments.

FIG. 5 illustrates an example of a blockchain ledger 500, such as the private ledger maintained by the network access devices 20, 22. In the example embodiment of FIG. 5, the user equipment 10 provides encrypted user media data 510, such as video footage data to at least one access device 20, 22, which may store the encrypted user media data to the blockchain.

Blockchain state information shared by the nodes may store all the transactions and history carried out in the network 20 40, such as the user information and/or associated spatiotemporal information. The blockchain state information 502, 504, 506 is stored in the blockchain ledger 500 and each block may comprise a hash code 514 of the current block, a hash code 508 of the previous block, and a combined hash code 512. Each node may comprise the ledger whose content is in sync with other ledgers. The nodes may validate and commit transactions in order to reach consensus. Each node may have their own copy of the ledger which is in some embodiments permission-controlled, so participants see only appropriate transactions.

Changes in resource ownership in the blockchain 20 take the form of blockchain transactions secured by strong cryptography. A blockchain transaction may comprise an identifier of a new owner, that is the recipient, of the resource, together with a cryptographic signature of the previous owner, that is the sender, such that malicious attackers cannot re-assign resources they do not own. Application of blockchain technology and the ledger enable a way to track the unique history of transactions by the individual nodes in the network.

To establish a next block 506, the transaction is broadcast, issued or provided (e.g. by or in response to block 130, 210, 230, 320), into the blockchain network 40, 60, which generally refers to a dissemination method suitable for the context, which will cause the transaction to be communicated to at least some of the nodes of the network in general. Reaching each and every node with each and every transaction is not strictly necessary.

A node establishing the next block 506 may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. Once a miner discovers the proof-of-work, it can publish the block 506, which other nodes of the system will then add to the blockchain as the new most recent established block with proof of work code field 516.

In case the miner node discovers a proof-of-work based on an incomplete set of transactions, for example if some transactions did not reach the miner node, other nodes in the network will not accept the block into the blockchain, and it will be excluded from a consensus version of the blockchain in the system.

Although discussed above in terms of proof-of-work, in some embodiments a proof-of-stake may be used instead of, or additionally to, a proof-of-work. In a proof-of-stake based system, a new block is accepted once a sufficient fraction of resources are proven as owned by nodes ready to accept the new block version.

Once a new block 506 is established, the blockchain 500 becomes longer. A transaction is considered the more reliable, the larger the number of blocks established since the block where the transaction is comprised. This is since transactions are hashed into the chain of blocks, and discrepancies in the block chain are resolved as the block chain gets longer. In each next block 506 in the sequence, a hash of the previous block 508 may be included along with the transactions, attaching the blocks to each other to form the chain 500. Hashes 508 linking the blocks together to form a chain may be referred to as Merkle hashes. Maliciously modifying a transaction in a block far down the chain would involve re-doing the work of finding proofs for all subsequent blocks, since the input to the hash function for the block comprising the transaction would be changed, causing the resulting hash value, with the proof in that block, to no longer be disposed in the desired area in the output space of the hash function.

For example, when the media data 510 is recorded, the owner encrypts the media data with a one-time key ($K_{enc}$) and hands the media data over to available access network device(s) 20 along with the hash of a plain image of the media data. The access network device 20 may provide a signed blockchain user information transaction $Tx_{media}$ to the private blockchain ledger ($Tx_{media}$), for example by applying AES encryption which may be designated as below:

$Tx_{media}$: {AES($K_{enc}$, media), hash(media)}

A number of measures can be implemented to deter users from abusing the network (e.g a distributed denial of service (DDOS) where a user would submit media repeatedly with intent to flood the cell tower network). For example, a nominal payment may be required from the user per unit of media. Additional rules could also be introduced to regulate how much data can be submitted per user, for example.

The access network device 20 may further generate 120 the proof of location indication transaction. The proof of location indication transaction may comprise the location of the UE 10 and a hash of an identifier of the user or the user equipment (such as a public key), the location of the user equipment, time of determining the location or associated with the user information and a salt.

For example, all nearby cell towers can run a distributed consensus algorithm to establish approximate quantised location of the user. As the media data is stored on the private ledger, the physically closest cell tower(s) may broadcast publically the proof of location indication transaction $Tx_{pub}$ on the general (public) ledger:

$Tx_{pub}$: {location, hash($PK_{owner}$+location+time+salt)}

$PK_{owner}$ refers to a public key of the user, here the information owner. The access network device 20 may also send the $Tx_{pub}$ to the user equipment 10, who keeps track of all the $Tx_{pub}$ that relate to the user (the registration of user's public key with the network is assumed to have taken place before this step).

A proof of location requesting device 30, below also referred to as requestor, which may be basically any party interested for the information, can in block 200 search through the public ledger to identify transaction(s) associated with the location of interest used as search input. Blocks generated in the Blockchain based system are ordered in time (and may even include a timestamp), if the requestor 30 are interested in a particular time period, they can get a rough idea of the timeframe from the block time. In some embodiments, the time information of the block applies as the temporal information associated with the user information. To pinpoint the location of interest, the requesting device 30 can filter the transactions in the desired time period by the location of interest. Hence the search will result in a list of relevant transactions.

The requestor 30 then needs to let the network access devices 20, 22, 24 (and the user information owner, in the present examples represented by the UE 10) know that they are willing to get access to the information (an in some embodiments to provide an asset for exchange). Thus, they may, with reference also to block 210, broadcast (on the public ledger) a proof of location request transaction ($Tx_{ad}$) referencing one or more $Tx_{pub}$ in the shortlist:

$Tx_{ad}$: {$Tx_{pub\_i}$, ..., $Tx_{pub\_n}$, Reward}

Here Reward is the reward the requestor 30 commits to paying for the media in the query. The UE 10 may detect 310 the $Tx_{ad}$ and realise it is associated with her media (on the basis of the earlier stored $Tx_{pub}$, for example). The UE 10 may then in block 320 indicate the user's willingness to participate in the exchange by broadcasting a response transaction $Tx_{ack}$ with the user's public key $PK_{owner}$:

$TX_{ack}$: {$Tx_{ad}$, $PK_{owner}$}

The deal may be sealed after the requestor 30 in block 230 issues a transfer transaction in block 230. In the present example, such transfer transaction ($TX_{trans}$) may be defined:

$TX_{trans}$: {From: $PK_{Requestor}$, To: $PK_{Lock}$, Amount: Reward, Assignee: $PK_{owner}$}

The $Tx_{trans}$ may be adapted to cause creation of a Lock ($PK_{Lock}$) account, which may be a special account that can only transfer value to the assignee (the media owner in this case). This enables to ensure the value will not be double spent prior to the transaction. In an embodiment, the $PK_{Lock}$ is a one-time account, meaning that the associated public private key pair is never to be reused.

Figure 6:
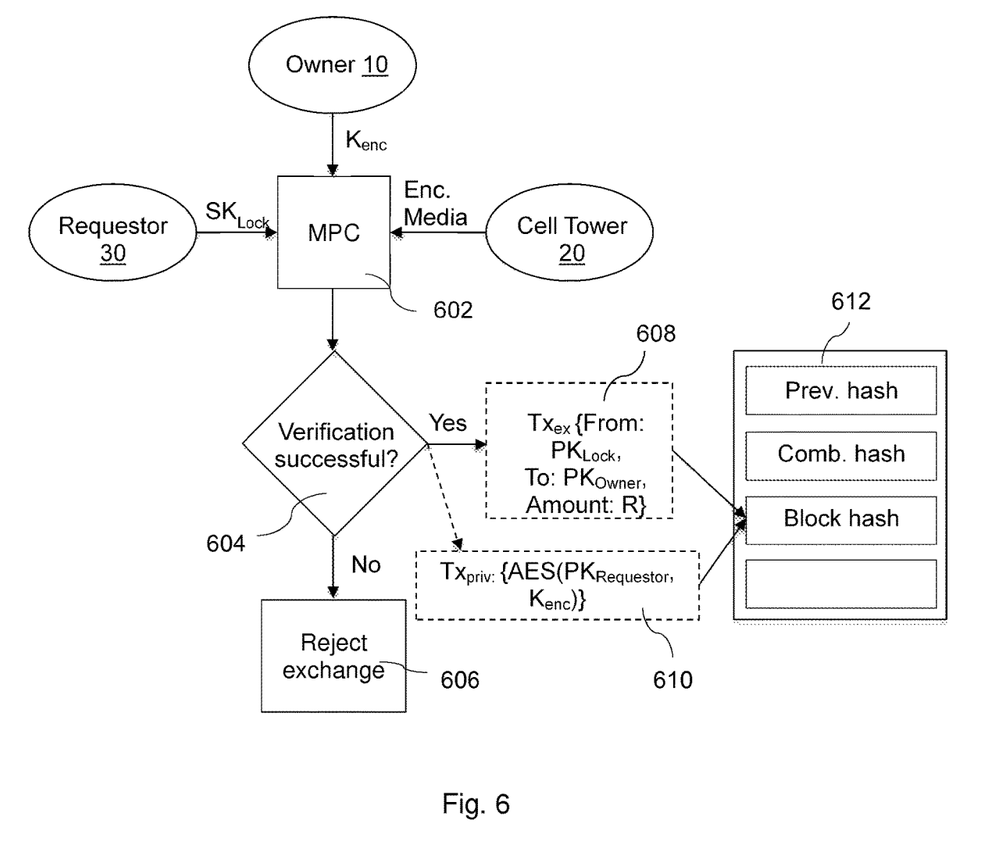
FIGS. 6, 7, and 8 illustrate methods in accordance with at least some embodiments.

Finally, the exchange needs to happen. Reference is made to FIG. 6 illustrating an example of actions carried out for verifying and carrying out the exchange. In some embodiments, multi-party computation (MPC) is applied 602 to make sure that the exchange is done fairly. The MPC may run among the UE 10, requestor 30 and the access network (device) 20. However, it is to be appreciated that other parties may be involved depending on variations of this protocol. For carrying out the MPC 602, the following actions are carried out:

The Requestor 30 (locally) inputs a private key $SK_{Lock}$ to the Lock account.

The UE 10 (locally) inputs the encryption key $K_{enc}$ for media.

The access network device 20 (locally) inputs the encrypted media.

Figure 7:
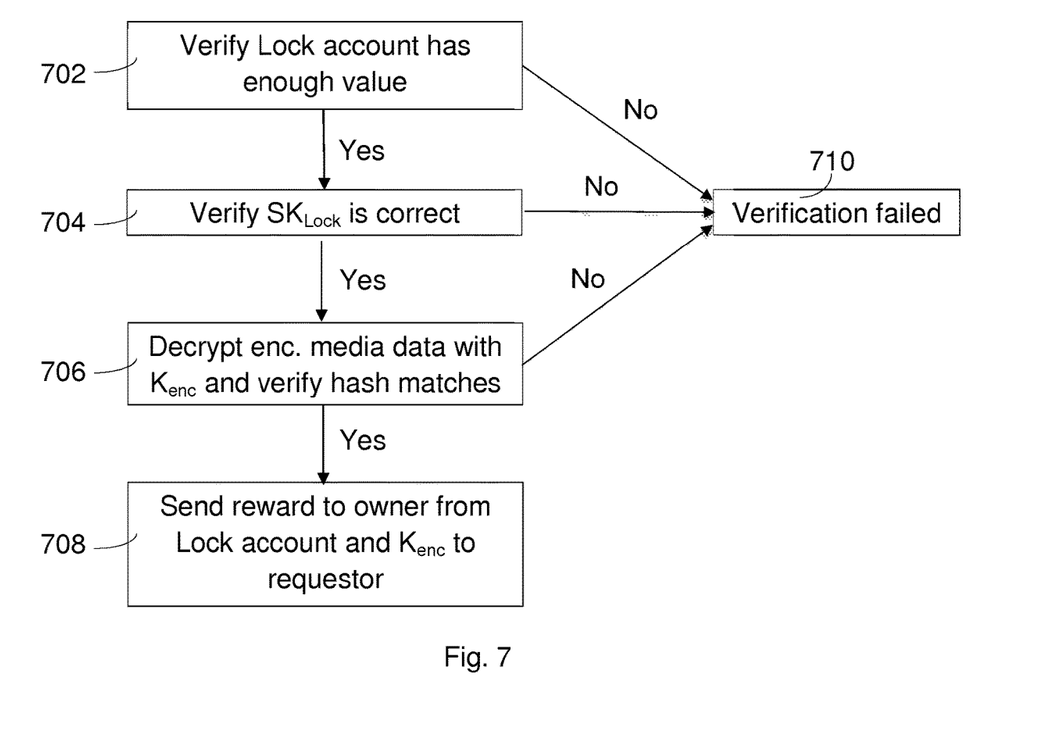

FIG. 7 illustrates a further example for verifying the exchange, such as the verification by the MPC 602 illustrated above. The MPC verifies 702 that the Lock account $PK_{Lock}$ has sufficient value to meet the exchange, verifies 704 that the $SK_{Lock}$ is correct (matches with the Lock account public key), and verifies 706 that the encryption key $K_{enc}$ decrypts the data. The encryption key verification may be alternatively performed by hashing the decrypted media data and comparing the hashes.

If any of the verification stages fails the verification fails 710 and the exchange is rejected 606. If the verification 602, 604, 702-706 is successful, the exchange may be carried out 608, 708. Thus, the MPC may output a value exchange or payment transaction $Tx_{ex}$ from the Lock account $PK_{Lock}$ to an account of the owner $PK_{owner}$:

$TX_{ex}$: {From: $PK_{Lock}$, To: $PK_{Owner}$, Amount: Reward}

In one embodiment, wireless access network device(s) 20 may also be rewarded for facilitating the exchange, e.g the cell towers get a small portion of the reward for storing the data.

The $Tx_{ex}$ may be broadcast 608 to the parties participating in the MPC 602, hence any of them can forward the transaction 608 to the ledger.

The MPC may send the encryption key $K_{enc}$ privately to the requestor 30. Again, in some embodiments the $K_{enc}$ may be broadcast 610 as a transaction to all involved in the MPC, encrypted with the public key $PK_{Requestor}$ of the requestor 30) e.g. by AES or RSA encryption:

$Tx_{priv}$: {AES($PK_{Requestor}$, $K_{enc}$)}

Lastly, $Tx_{ex}$ 608 is evaluated by the entire ledger. The verification of the transactions 608, 610 results as new record 612, and the encrypted user media may be sent from the private network 60 or the access network device 20 to the requestor 30.

In an embodiment, the role of MPC can be performed in a trusted environment, for example in an SGX based processor environment, such that the code ran on the processor corresponds exactly to the MPC protocol, is agreed by the parties in advance and no single party has control over the processor, which could be ran as a cloud service, for example.

Figure 8:
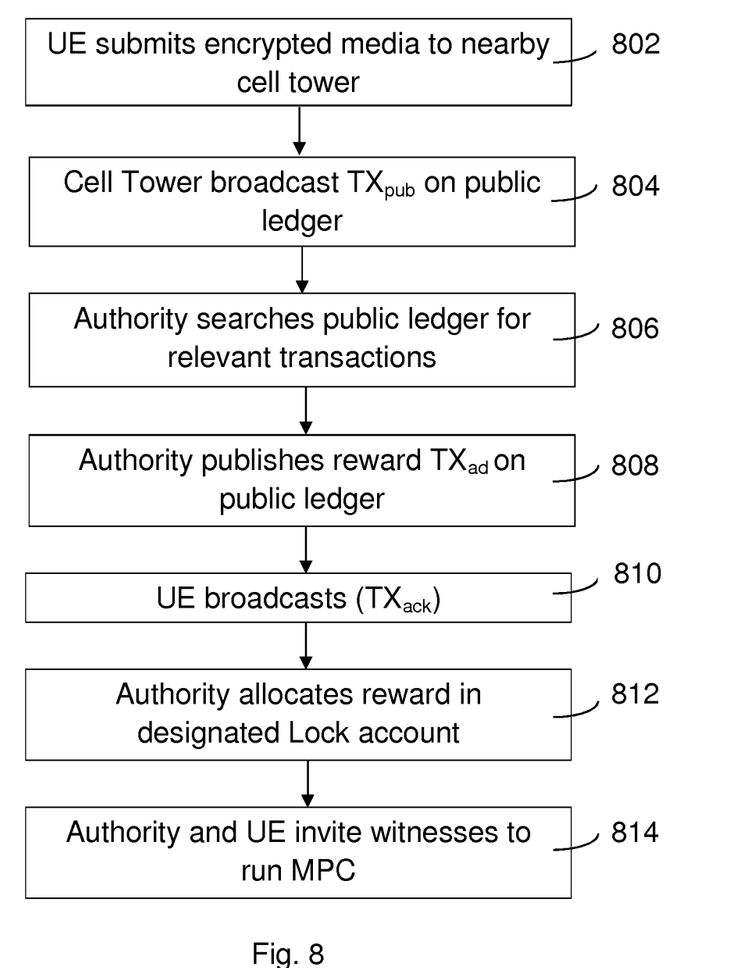

FIG. 8 is a summarizing example of a method and protocol which may be carried out in a distributed system according to some embodiments, with example references to the actions in the previous examples. In the example of FIG. 8, a cell tower, which may refer to an access network device of an operator controlling or operating at least some of the cell tower infrastructure, may carry out the method of FIG. 1, and an authority, such as a police unit, may operate as the requesting device 30. As illustrated in block 814, in an embodiment witnesses may be invited to run MPC to verify the exchange, e.g. to carry out the features illustrated in connection with FIGS. 6 and/or 7.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device, a wearable device, a base station, access point device, a network management or control device, a server, or any other apparatus provided with communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 9:
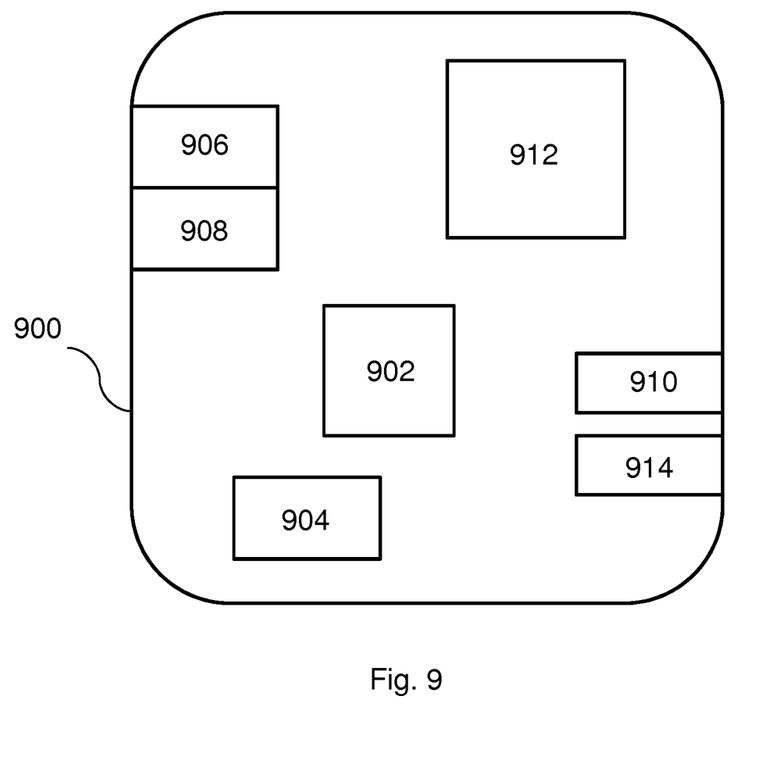
FIG. 9 illustrates an apparatus in accordance with at least some embodiments of the present invention.

FIG. 9 illustrates an example apparatus capable of supporting at least some embodiments of the present invention. Illustrated is a device 900, which may comprise a communications device in some embodiments arranged to operate as a node in a blockchain-based system. The device may be arranged to operate as the UE 10, the user information requesting device (e.g. 30 of FIG. 1), or the proof of location providing or verifying device (e.g. the access network device 20), and carry out at least some of the embodiments illustrated in connection with FIGS. 1 to 3. The device may include one or more controllers configured to carry out operations in accordance with at least some of the embodiments illustrated above, such as at least some of the features illustrated above in connection with FIGS. 1 to 8.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform action to carry out at least some of the presently disclosed features.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 900 but accessible to the device. For example, control parameters affecting operations related to causing the above-illustrated transactions and related information may be stored in one or more portions of the memory and used to control operation of the apparatus.

Further, the memory may comprise device-specific cryptographic information, such as secret and public key of the device 900. The transactions may be signed with a private key associated with the respective device or user. The apparatus may be provided with a public-private key pair at manufacture. The private key may be stored on the certifying device's secured memory portion, such that it cannot be tampered with and the private key cannot be stolen. Moreover, the secured portion may also hold the hashing and signing logic.

The device 900 may comprise a transmitter 906. The device may comprise a receiver 908. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, wireless local area network, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 904 or on a cloud accessible via the transmitter 906 and the receiver 908, or via the NFC transceiver 910, and/or to play games.

The device 900 may comprise or be arranged to accept a user identity module or other type of memory module 914. The user identity module may comprise, for example, a subscriber identity module, SIM, and/or a personal identification IC card installable in the device 900. The user identity module 914 may comprise information identifying a subscription of a user of device 900. The user identity module 914 may comprise cryptographic information usable to verify the identity of a user of device 900 and/or to facilitate encryption and decryption of communication effected via the device 900, such as the private and/or public keys as illustrated above.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9. For example, the device may comprise at least one digital camera or other user media recording device. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 910 and/or the user identity module 914.

The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 8 may be taken in isolation or further combined together.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communications.

Acronyms List

AES Advanced Encryption Standard
ASIC Application-specific integrated circuit
DDOS Distributed denial of service
FPGA Field-programmable gate array
GSM Global system for mobile communication
IC Integrated Circuit
LTE Long term evolution
NFC Near-field communication
PoS Proof-of-stake
PoW Proof-of-work
RSA Rivest Shamir Adleman
SGX Software guard extensions
UI User interface
WCDMA Wideband code division multiple access
WLAN Wireless local area network

The invention claimed is:

1. A method for a user equipment, comprising:
sending user information from the user equipment to a wireless access network device for generating a proof of location indication transaction for a distributed ledger on the basis of spatiotemporal information associated with the user information,
detecting, by the user equipment, a proof of location request transaction provided to the distributed ledger by a proof of location requesting device, wherein the proof of location request transaction identifies the proof of the location indication transaction, and
causing, by the user equipment, provision of a response to the proof of the location request transaction to the distributed ledger, the response indicating user's willingness to provide the user information associated with the proof of location indication transaction,
wherein at least the proof of the location indication transaction is stored in a public blockchain ledger and a private blockchain ledger is maintained by wireless access network devices or wireless access network service providers for controlling access to the user information.

2. The method according to claim 1, wherein
the proof of the location request transaction comprises information of an asset offered in exchange of providing the user information associated with the proof of the location indication transaction,
the response to the proof of the location request transaction indicates the user's willingness to participate in the exchange of the user information and the asset, and
a transfer transaction is provided to the distributed ledger by the proof of the location requesting device and comprises a signed authorization to issue the asset in response to verification of the exchange.

3. The method according to claim 2, wherein the verification of the exchange comprises multi-party computation comprising:
verifying an account indicated in the proof of the location request transaction, and
verifying that an encryption key provided by the user equipment decrypts the user information provided by the user equipment in encrypted form, wherein
a transfer transaction is issued by the proof of the location requesting device to the account for releasing the asset for the user in response to successful verification of the exchange, and
the encryption key is provided for the proof of the location requesting device in response to successful verification of the exchange.

4. The method according to claim 1, wherein the user information comprises audio and/or visual media data generated by the user equipment at the location of the user equipment.

5. The method according to claim 1, wherein the user information is being stored in the private blockchain ledger in encrypted form with a hash of the user information.

6. The method according to claim 1, wherein the location of the user equipment is defined on the basis of estimation of position of the user equipment in relation to two or more neighbouring cellular base station sites.

7. An apparatus comprising
at least one processor; and
at least one memory including computer program code for one or more programs, the at least one memory and the computer program code configured to, with the at least one processor, cause the apparatus to perform at least the following:
send user information to a wireless access network device for generating a proof of location indication transaction for a distributed ledger on the basis of spatiotemporal information associated with the user information,
detect a proof of location request transaction provided to the distributed ledger by a proof of location requesting device, wherein the proof of location request transaction identifies the proof of the location indication transaction, and
cause provision of a response to the proof of the location request transaction to the distributed ledger, the response indicating user's willingness to provide the user information associated with the proof of the location indication transaction
wherein at least the proof of the location indication transaction is stored in a public blockchain ledger and a private blockchain ledger is maintained by wireless access network devices or wireless access network service providers for controlling access to the user information.

8. The apparatus of claim 7, wherein
the proof of the location request transaction comprises information of an asset offered in exchange of providing the user information associated with the proof of the location indication transaction,
the response to the proof of the location request transaction is provided to the distributed ledger by a user equipment and indicates the user's willingness to participate in the exchange of the user information and the asset, and
a transfer transaction is provided to the distributed ledger by the proof of the location requesting device and comprises a signed authorization to issue the asset in response to verification of the exchange.

9. The apparatus of claim 8, wherein the verification of the exchange comprises multi-party computation comprising:
verifying an account indicated in the proof of the location request transaction, and
verifying that an encryption key provided by the user equipment decrypts the user information provided by the user equipment in encrypted form, wherein
a transfer transaction is issued by the proof of the location requesting device to the account for releasing the asset for the user in response to successful verification of the exchange, and
the encryption key is provided for the proof of the location requesting device in response to successful verification of the exchange.

10. The apparatus of claim 7, wherein the user information comprises audio and/or visual media data generated by the user equipment at the location of the user equipment.

11. The apparatus of claim 7, wherein the user information is being stored in the private blockchain ledger in encrypted form with a hash of the user information.

12. The apparatus of claim 7, wherein the location of a user equipment is defined on the basis of estimation of position of the user equipment in relation to two or more neighboring cellular base station sites.

13. A non-transitory computer readable medium having stored thereon a set of computer readable instructions that, when executed by at least one processor, cause an apparatus to:
send user information to a wireless access network device for generating a proof of location indication transaction for a distributed ledger on the basis of spatiotemporal information associated with the user information,
detect a proof of location request transaction provided to the distributed ledger by a proof of location requesting device, wherein the proof of location request transaction identifies the proof of the location indication transaction, and
cause provision of a response to the proof of the location request transaction to the distributed ledger, the response indicating user's willingness to provide the user information associated with the proof of the location indication transaction,
wherein at least the proof of the location indication transaction is stored in a public blockchain ledger and a private blockchain ledger is maintained by wireless access network devices or wireless access network service providers for controlling access to the user information.

* * * * *